Aug. 25, 1925.

C. R. HAMMOND

PISTON AND CONNECTING ROD

Filed Sept. 15, 1924

INVENTOR.
C. R. Hammond,

BY

Geo. P. Kimmel ATTORNEY.

Patented Aug. 25, 1925.

1,551,497

UNITED STATES PATENT OFFICE.

CLAYSON ROSS HAMMOND, OF SALEM, OREGON.

PISTON AND CONNECTING ROD.

Application filed September 15, 1924. Serial No. 737,883.

*To all whom it may concern:*

Be it known that I, CLAYSON ROSS HAMMOND, a citizen of the United States, residing at Salem, in the county of Marion and State of Oregon, have invented certain new and useful Improvements in Pistons and Connecting Rods, of which the following is a specification.

This invention relates to a piston and connecting rod for use in connection with steam, air and internal combustion engines, and has for its object to provide, in a manner as hereinafter set forth, a durable and highly efficient construction of piston and connecting rod for use in various types of engine cylinders and with the rod and piston set up in such relation whereby the connection therebetween is conveniently accessible.

A further object of the invention is to provide, in a manner as hereinafter set forth, a piston and connecting rod construction to ensure perfect alignment of the piston with the bore of the cylinder, to allow for the piston to turn slowly in the cylinder bore and thereby preventing the piston and cylinder from wearing out of round.

A further object to the invention is to provide, in a manner as hereinafter set forth, a piston and connecting rod construction to prevent piston slap, cylinder scoring, piston seizing to cylinder, oil pumping, and further whereby the piston and connecting rod can be aligned and positioned without removing the rod from the crank shaft of the engine.

A further object of the invention is to provide, in a manner as hereinafter set forth, a piston and connecting rod construction, whereby the impact of the explosion in the cylinder is given to the connecting rod at the exact center of the under side of the piston head.

A further object of the invention is to provide, in a manner as hereinafter set forth, a piston and connecting rod construction including a ball and socket joint connection therebetween formed to permit the piston to turn and to cause the ball to always fit and not wear flat as does the common piston pin.

Further objects of the invention are to provide, in a manner as hereinafter set forth, a piston and connecting rod simple in construction and arrangement, strong, durable, thoroughly efficient in use, conveniently assembled and comparatively inexpensive to set up.

With the foregoing and other objects in view, the invention consists of the novel construction, combination and arrangement of parts, as hereinafter more specifically set forth and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
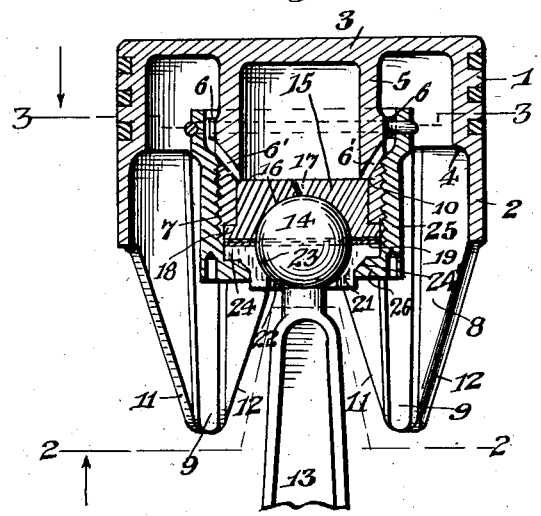
Figure 1 is a sectional elevation of a piston and connecting rod, in accordance with this invention.
Figure 3:
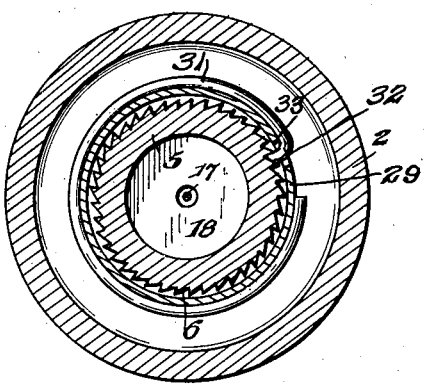
Figure 3 is a section on line 3—3, Figure 1.
Figure 2:
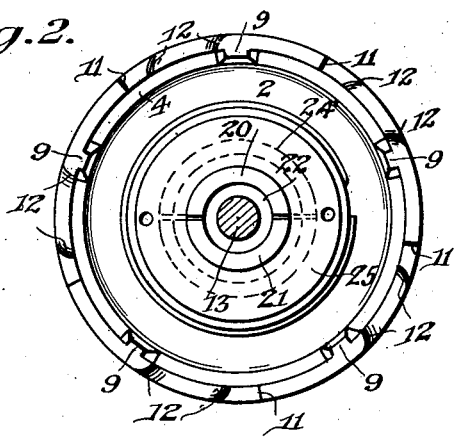
Figure 2 is a section on line 2—2, Figure 1.
Figure 4:
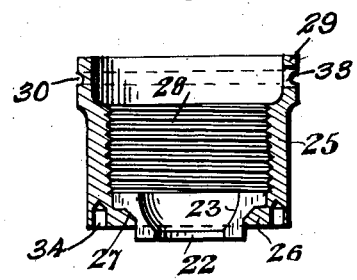
Figure 4 is a vertical sectional view of the rear bearing element and its adjusting and retaining member.
Figure 5:
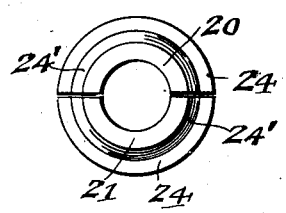
Figure 5 is an inverted plan of the rear bearing element.

Referring to the drawings in detail, the piston which is cylindrical in contour comprises a body portion including a forward part 1 and a rear part 2. The forward end of the forward part 1 is closed, as at 3 and which constitutes the head of the piston. The inner diameter of the forward part 1 is smaller than the inner diameter of the rear part 2, and the latter is of greater length than the forward part 1. The setting up of the forward part 1 of an inner diameter less than the inner diameter of the rear part 2 provides an annular shoulder 4 on the inner face of the piston, and at the rear terminus of the forward part 1.

Formed integral with the inner face of the head 3, as well as arranged concentrically with respect to the piston body, is a rearwardly extending cylindrical sleeve 5, having its periphery intermediate its ends, formed with a circumferentially extending row of ratchet teeth 6. The sleeve 5 is also provided with inclined ports 6' for conducting lubricant therein, and the sleeve 5 is also formed with threads 7, which extends from the ports 6' and terminate at the rear end of the sleeve thereof.

The piston further includes a skirt which is formed integral with and extends rearwardly from the rear terminus of the part 2 and is constructed from a series of substantially triangular shaped projections 8. Formed integral with the shoulder 4, and also with the inner faces of the part 2 and projections 8, is a series of longitudinally extending reinforcing ribs 9, each arranged in spaced relation with respect to each other and further disposed centrally of a projection. One side edge of each of the projections 8 is formed with a sharp point 11 and the other side rounded, as at 12, and the said point 11 is employed for scraping the lubricant back towards the crank case. This scraping action causes a slight resistance and in connection with the sharp and dull edges of the projections serves to rotate the piston in the cylinder. The skirt is machined substantially larger than the bore of the cylinder and the projections are slightly compressed when installed and by this construction and arrangement oil pumping, seizing and scoring is prevented. Heat dissipation is greatly promoted, due to the concentric form of the shirt and through the points of the projections.

The connecting rod is indicated by the reference character 13 and is formed with a spherical end 14, which is connected in a manner to be hereinafter referred to, medially of the piston body and such connection is a universal one.

The inner diameter of the sleeve 5 at the rear portion thereof is greater than the forward portion which provides a shoulder 10, positioned at the inner end of the ports 6'. Extending into the inner end of the sleeve 5, and abutting against the shoulder 10 is a forward bearing element 15 formed with a semi-spherical socket 16 which opens at the rear end of said element 15, and the latter is furthermore provided at its forward end with an opening 17 communicating at its rear end with the socket 16 and at its forward end with the interior of the sleeve 5. The opening 17 provides means for conducting lubricant from the interior of the sleeve 5, forwardly of the element 15 to the socket 16. The rear end of the element 15 is formed with a laterally extending annular flange 18, which, when the element 15 is mounted in the sleeve 5, abuts against the rear edge of the latter, as shown in Figure 1.

When the forward bearing element is mounted in position it is adapted to enclose the forward portion of the spherical end 14 of the connecting rod 13, and acts as a bearing for said portion.

Opposing the forward bearing element 17, as well as separated therefrom by the shims or liners 19, and arranged rearwardly of the sleeve 5 is a rear bearing element consisting of a flanged annulus formed of two oppositely disposed similarly constructed semi-circular sections 20, 21. Each of said sections has the rear portion of its inner face plane, as at 22, and its forward portion diverging from said rear portion and arcuate in vertical section, to provide when the sections are positioned in matched relation a semi-spherical shaped seat 23, against which is seated a part of the rear portion of the spherical end 14, of the rod 13. Each of the sections 20, 21 is formed with a laterally extending semi-circular flange 24, of less thickness than the length of and flush with the forward edge of the section. The outer face of each of the sections 20, 21, has a forwardly extending and outwardly bevelled semi-circular shoulder 24' which terminates in the rear face of the flange 24, at a point inwardly of the free edge of the latter.

When the rear bearing element is arranged in its associated position with respect to the spherical end 14 of the connecting rod, the said end projects forwardly and rearwardly of the seat 23 and is mounted on the latter.

The rear bearing element is adjustably supported rearwardly of and from the sleeve 5, by a combined adjusting and retaining member consisting of a hollow cylindrical body portion 25, having its rear end provided with an inwardly extending annular flange 26 formed with an outwardly bevelled free edge 27 which provides a seat for the shoulders 24' of the sections 20, 21. The forward face of the flange 26 is of less width than the rear face thereof and constitutes a support for the flanges 24 of the sections 20, 21. The shoulders 24', bevelled edge 27 and forward face of the flange 26 co-act to move the rear element to and from the forward bearing element when said body portion 25 is adjusted lengthwise of the sleeve 5. The rear bearing element when mounted in the combined adjusting and retaining member therefor projects rearwardly therefrom, see Figure 1.

The body portion 25 is interiorly threaded from a point removed from flange 26 to a point removed from the forward end of its inner face, as at 28, and said body portion 25 threadedly engages with the peripheral threads 7, of the sleeve 5 whereby the combined adjusting and retaining members is adjustably connected to the latter.

That part of the body portion 25 which projects forwardly from the threads 28 is offset and of less thickness, as at 29, to clear the outer face of the sleeve 5. The outer face of the offset portion 29 is formed with a circumferentially extending peripheral groove 30, for the reception of a resilient locking member 31, which constitutes in connection with the teeth a ratchet for the purpose to releasably lock the combined adjusting and retaining member in adjusted position. The member 31 is formed of a length of spring wire and when positioned in the groove 30 tightly binds against the wall thereof.

The member 31 at one end is formed with a right angularly disposed part 32, which constitutes a locking pawl, nose or dog of a length to extend through an opening 33 in the reduced portion 29 and engage in the teeth 6. The member 31 in connection with the pawl 32, prevents back rotation of the body portion 25, with respect to the sleeve 5, when said body portion has been adjusted.

The body portion 25 has its rear end formed with a pair of diametrically disposed cavities 34, for the reception of a suitable tool for conveniently revolving said body portion when desired.

The rear bearing element is machined in such a manner that it can be split permitting the bearing elements and adjusting and retaining member to be assembled with the wrist ball or spherical end 14 fixed on the connecting rod or disassembled with the ball in place. The ratchet teeth, on the sleeve 5, furnishes a substantial engagement for the adjusting of the locking spring pawl of the retaining member.

The construction of the piston prevents distortion from combustion heat, under such conditions increasing the life of the piston.

Although the preferred embodiment of the invention is as illustrated and described, yet it is to be understood that changes in the details of construction can be had which will fall within the scope of the invention as claimed.

What I claim is:—

1. In a combination a hollow piston provided with an interiorly arranged rearwardly extending peripherally threaded sleeve, a stationary forward bearing element mounted in said sleeve at the rear thereof and having a semi-spherical socket opening at its rear, a sectional rear bearing element in the form of an annulus and arranged rearwardly of the forward element, said rear element having a portion of its inner face arcuate in vertical section to provide a seat and further provided with a lateral flange and peripheral bevelled shoulder, liners interposed between said elements, and means threadedly engaging with said sleeve and further abutting against said shoulder and flange for adjustably retaining said rear element in position, said rear element and means connecting the spherical end of a connecting rod to said piston.

2. In a combination a hollow piston provided with an interiorly arranged rearwardly extending peripherally threaded and toothed sleeve, a stationary forward bearing element mounted in said sleeve at the rear thereof and having a semi-spherical socket opening at its rear, a sectional rear bearing element, said elements providing means for universally connecting the spherical end of a connecting rod to the piston, means threadedly engaging with said sleeve and further abutting against said shoulder and flange for adjustably retaining said rear element in position, and a spring pawl carried by said means and coacting with said teeth to provide a ratchet lock for said retaining means.

3. In a combination a hollow piston provided with an interiorly arranged rearwardly extending peripherally threaded and toothed sleeve, a stationary forward bearing element mounted in said sleeve at the rear thereof and having a semi-spherical socket opening at its rear, a sectional rear bearing element in the form of an annulus and arranged rearwardly of and opposing the forward element, said rear element having a portion of its inner face arcuate in vertical section to provide a seat and further provided with a lateral flange and peripheral bevelled shoulder, said elements providing means for universally connecting the spherical end of a connecting rod to the piston, means threadedly engaging with said sleeve and further abutting against said shoulder and flange for adjustably retaining said rear element in position, and a spring pawl carried by said means and co-acting with said teeth to provide a ratchet lock for said retaining means, and liners interposed between said elements.

4. In the combination a hollow piston provided with an interiorly arranged rearwardly extending peripherally threaded sleeve, a forward bearing element mounted in said sleeve and having a semi-spherical socket opening at the rear thereof, a rear bearing element opposing and spaced from said forward element and formed of a sectional annulus having a portion of its inner face providing an annular seat arcuate in vertical section, said annulus being laterally flanged and formed with a bevelled peripheral annular shoulder, and means threadedly engaging with said sleeve and further abutting the flange and shoulder of the annulus for adjustably retaining said annulus in position, said elements and means connecting the spherical end of a connecting rod to the piston, and liners interposed between said elements.

In testimony whereof I affix my signature hereto.

CLAYSON ROSS HAMMOND.